3,306,819
DERIVATIVE OF PECTIN, ITS PROCESS OF PREP-
ARATION AND ITS METHOD OF USE
Jean Marie Farthouat, Romainville, and François
Clemence, Sarcelles-Locheres, France, assignors to
Roussel-UCLAF, S.A., Paris, France, a corporation of France
No Drawing. Filed Oct. 2, 1962, Ser. No. 227,704
Claims priority, application France, Oct. 9, 1961,
875,377; July 20, 1962, 904,635
14 Claims. (Cl. 167—55)

This invention relates to a new derivative of pectin, the pectinate of bismuth, as well as its process of preparation, its methods of use and compositions containing the same.

It is an object of the present invention to obtain a new derivative of pectin, the pectinate of bismuth.

Another object of the invention is to develop a process for the preparation of the pectinate of bismuth.

A further object of the invention is to obtain cosmetic products, particularly beauty creams, containing the pectinate of bismuth.

A still further object of the invention is to obtain therapeutic compositions containing the pectinate of bismuth.

A further object of the invention is the development of a therapeutic process comprising administering a therapeutic dose of the pectinate of bismuth to patients having gastro-intestinal illnesses, especially hyperchlorohydria.

These and other objects of the invention will become more apparent as the description thereof proceeds.

The pectinate of bismuth, a new chemical compound, possesses remarkable and interesting properties, which allow its industrial application. Not only is it utilizable in human and veterinary medicine but it can be used in other fields such as that of cosmetics.

The pectinate of bismuth is prepared starting from pectin. Pectin is a starting material of natural origin which is variable in its structure and its composition depending on its origin and the treatments to which it is subjected. Consequently the pectinate of bismuth itself is variable in its elemental composition.

In particular, pectin having a macromolecule formed of a chain of tetragalacturonic acid moieties can be substituted by any number of bismuth atoms in such a manner that there can exist an unlimited series of pectinates of bismuth in which the amount of substitution varies from 0 to 4 atoms of bismuth per tetragalacturonic acid moiety of the chain. Similarly, according to the quality of pectin utilized, the pectinate of bismuth can have a variable proportion of methyl ester groupings.

Theoretically pectin has a molecular weight of from 30,000 to 500,000 and is comprised of about a 75% methylated tetragalacturonic acid moiety having the structural formula

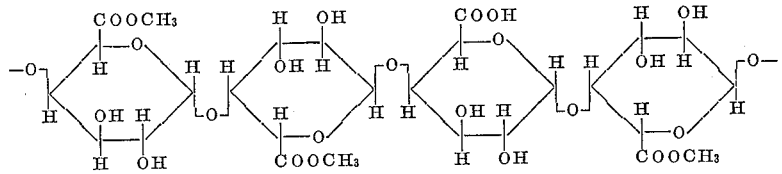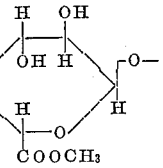

The amount of methyl groups, of course, can vary.

The pectinate of bismuth can be, in view of this, characterized by its method of formation and by a recitation of its chemical and physical properties.

It occurs in the form of a colorless, cream, beige or chestnut powder, entirely insoluble in water, but susceptible to swelling in this medium to give a gel which retains a large amount of water. It is insoluble in organic solvents such as alcohol, ether, acetone, benzene, chloroform, etc.

It is soluble in aqueous dilute solutions of strong acids, and this solution presents an elevated dextrorotatory power, with reference to the rotatory power of pectin which it was made from.

It does not have a definite melting point properly speaking. It undergoes a total instantaneous decomposition toward 310° C. By heating slowly on the Maquenne block, the decomposition starts toward 240° C.

Its content of bismuth, determined by analysis, can be variable as shown above. However, one obtains and uses in general the pectinates of bismuth whose amount of elementary bismuth is between 10 and 30%, and more particularly between 20 and 25%. The presence of one BiO+ ion in the 75% methylated tetragalacturonic acid moiety above would give a pectinate of bismuth having a bismuth content of 21.9%.

It possesses the interesting particularly of being dispersed in solutions of strong electrolytes to give creams of a very great unctuousness, whence its industrial utilization in cosmetics, as is shown later.

Finally, the pectinate of bismuth possesses in an elevated degree remarkable therapeutic properties which, together with its very weak toxicity, allows its use in human and veterinary medicine.

The invention also extends to the process of preparation which consists in treating a solution of pectin with a solution of a salt of bismuth, then separating the pectinate of bismuth which has precipitated in the course of this preparation.

It is known that the salts of bismuth have a great tendency to hydrolyze and are easily precipitated from their solutions as hydroxides or insoluble basic salts of bismuth. In order to lessen this inconvenience, a particular characteristic of the process according to the invention resides in the fact that there is introduced, into the solution of pectin, a substance destined to counteract the simultaneous precipitation of an insoluble hydroxide or basic salt of bismuth formed by hydrolysis.

Such a result can be obtained, for example, by adding a strong acid, such as nitric acid to the solution of the salt of bismuth. However, the pectinate of bismuth obtained being soluble in these acids, it is necessary to add only the necessary amount of the acid, a large excess provoking a lowering of yield which can cancel out the improvement.

The determination of the limits between which the amount of acid to be added in order to avoid on one hand the hydrolysis of the salts of bismuth and on the other hand the dissolution of the pectinate of bismuth, is also a part of the invention. This amount is obviously a function of the concentration of bismuth in the reaction media.

It has been found that the amount of nitric acid, for example, to be added should be between about 1 time and 3 times the amount of elemental bismuth utilized. Thus, for a concentration of 3 g. of elemental bismuth per liter of reaction mixture (sum of the volumes of solutions of pectin and of salts of bismuth utilized) the concentration of nitric acid should be greater than 3 g. of nitric acid and less than 9 g. of nitric acid per liter of reaction mixture.

It is to be understood that other agents than acids can be used in order to avoid the precipitation of basic salts or hydroxides of bismuth. In a general manner, all known products for suppressing hydrolysis of bismuth salts, particularly organic polyols, such as glycerol for example, are suitable. The polyols can be added to the solution of bismuth or the solution of pectin. The amount of polyol, such as glycerol, to be added can be between about 2% and 20% of the volume of the reaction mixture. Amounts in excess of 20%, without being harmful, are of no additional value.

The pectinate of bismuth obtained by this process occurs in the form of a gel containing a very large amount of water. It is therefore necessary to cause it to undergo a preliminary dehydration before the process of drying. If it is dried conventionally, it produces a horny mass difficultly utilizable industrially. This preliminary dehydration is realized best by washing the gel by means of solvents having a strong affinity for water, such as acetone or alcohol.

The following examples of preparation and of use are illustrative of the invention. It is obvious to one skilled in the art that other procedures may be followed without departing from the invention.

EXAMPLE I

A solution of 100 g. of pectin in 10 liters of water was prepared by adding the pectin in small amounts and by agitating vigorously. On the other hand, a nitric acid solution of bismuth nitrate was prepared by placing 46 g. of bismuth subnitrate in suspension in 50 ml. of water, then by adding 69 ml. of 40° Bé. nitric acid.

The nitric acid solution of bismuth was poured into the solution of pectin while vigorously agitating. A quite thick gel was formed. This gel was agitated for a time, then filtered through a filter cloth. After vacuum filtration, the gel was mixed with 5 liters of water, vacuum filtered again, etc. These washings were continued until the pH of the wash water was about 6.

The gel was then washed several times with 95% ethyl alcohol, then with absolute ethyl alcohol. These alcoholic washings were made under lively agitation in such a manner as to avoid the formation of lumps.

The product was next dried at room temperature, then finely ground. Yield: 110 g.

The pectinate of bismuth thus obtained possessed a content of bismuth of 24%. Its specific rotation measured in a 1% solution in normal hydrochloric acid was $[\alpha]_D^{20} = +140°$.

EXAMPLE II

A solution of 5.22 g. of pectin in a mixture of 50 ml. of 30° Bé. glycerol and 450 ml. of water was prepared.

On the other hand, a nitric acid solution of bismuth nitrate was prepared by dissolving 2.44 g. of bismuth subnitrate in 3.6 ml. of 40° Bé. nitric acid, and by bringing the solution to a volume of 8 ml. with the aid of distilled water.

The solution of bismuth was quickly poured into the solution of pectin and glycerol. The pectinate of bismuth precipitated in the form of a gel which was agitated for a further 5 minutes, then vacuum filtered and washed with water and alcohol as in the preceding example. After drying at room temperature 4.25 g. of the pectinate of bismuth was obtained whose content of bismuth was 18%. Its specific rotation measured in a 1% solution in normal hydrochloric acid was $[\alpha]_D^{20} = +150°$.

EXAMPLE III

*Use in cosmetics*—Preparation of a non-fatty unctuous cream, based on the pectinate of bismuth.

3 g. of the pectinate of bismuth prepared according to the preceding example were mixed with 15 to 20 ml. of water. 10 ml. of 2 N hydrochloric acid were added thereto. The mixture was beaten and ground until a homogenous and translucent get was formed. 10 ml. of 2 N sodium hydroxide solution were adde to the gel.

The beating and homogenizing were continued by the usual mechanical methods, while incorporating in the mixture little by little 1 ml. of soluble essence of citron, then sufficient water in order to make 100 g. of cream. The beating was continued for a period of another 10 minutes. Thereafter the finished cream was packaged in opaque containers.

An unctuous cream was obtained, which can be used as a beauty cream in local applications on the hands or the face. This cream is particularly recommended for oily skin.

*Therapeutic utilization*—The pectinate of bismuth is characterized by its harmlessness and its efficacy. Studies of digestion in vitro have shown that this product forms with gastric juices a fluid and unctuous suspension, which is very fine and presents no tendency to sedimentation. This represents a notable progress with reference to bismuth subnitrate and to other salts of bismuth already known and used therapeutically for analogous purposes. These latter products are in effect very dense, depositing very rapidly from their suspensions and consequently do not have the efficacy of the cream form obtained with the pectinate of bismuth of the invention.

The pH of this gastric suspension is maintained in the neighborhood of 3, which indicates a notable buffering effect justifying the use of the new medicine, the pectinate of bismuth, in hyperchlorohydria.

The administration of the pectinate of bismuth to dogs at doses of 2g./kg. per os provoked neither swelling nor distending of the digestive viscera. The pectinate of bismuth was perfectly tolerated and the animals continued to take on weight even after 3 weeks of continuous daily treatment.

The state of diarrhetic dogs was improved, their recovery occurring in 48 hours.

The therapeutic applications of the pectinate of bismuth are in general those of derivatives of bismuth in the treatment of gastro-intestinal illnesses; that is to say, gastritis with hyperchlorohydria, gastro-duodenal ulcers and diarrhea of all origins: infectious, toxic and symptomatic.

The clinical results given hereafter were chosen as non-limitative examples of therapeutic applications of the pectinate of bismuth, the object of the invention.

*Case No. 1.—Mr. Cor, 37 years old*

Complained for several years of gastric pains of the burning type and not of cramps. These burning pains continued irregularly without periodicity and were very poorly calmed by the absorption of food.

The diagnosis was of a sickness due to an anxious temperament in which a certain abuse of alcoholic beverages (wine, beer) amplified the symptoms. He was also a patient who smoked very much (1 pack of cigarettes a day).

This subject used the classical small amounts of sedation for gastric pains which had in him only a very imperfect transitory action.

On administration to this patient of 2.5 g. (a half sachet) of the pectinate of bismuth before the two principal meals, after about 48 hours of administration there was noted a very clear improvement and, after several days, the burning pains almost disappeared, without the subject having modified his food habits.

*Case No. 2.—Mr. Lar, 30 years old*

Alimentary toxic infection or rapid onslaught without precise cause.

Symptoms: Moderate fever, nauseous state, sharp pains diffused through all the abdomen, numerous liquid stools.

In the presence of these clinical signs of moderate attack, the patient was subjected to the treatment by the pectinate of bismuth alone at a dose of a sachet of 5 g. per day for a period of 4 days.

The symptoms were rapidly improved, the stools diminished in frequency very rapidly and were reduced to normal in 48 hours.

*Case No. 3.—Mr. Lau, 50 years old*

Continued colitis in which no parasitical or infectious etiology had been found and which had in periodical fashion crises of enteritis: meteorism, abdominal colic, 2 or 3 liquid stools per day.

There was administered to this patient 1 sachet of 5 g. of the pectinate of bismuth, in the morning, for a period of one week.

The intestinal tone was greatly improved with disappearance of pains, of distension, of meteorism and reappearance of moulded stools (1 stool per day).

For therapeutic utilization, the pectinate of bismuth was administered in pharmaceutical forms convenient for medicines which are designated usually under the name of stomach and intestinal protectors and adsorbents. The method of administration is orally.

One of the simplest preparations is a sachet or envelope containing a unitary dose of 2 to 10 g. of the active principle utilized alone. Additionally, one can equally use all administratable forms in which the active principle is associated either in a vehicle or with other active principles. Granules can be prepared in which the pectinate of bismuth is associated particularly with sugar, gums, colorants, perfumes, etc. Similarly, the pectinate of bismuth can be associated with certain other salts of bismuth whose therapeutic interest has already been indicated. The pectinate of bismuth can also be prepared in the form of gels, colloidal suspensions, milks, creams, etc. In these cases the active principle is dispersed in a liquid medium containing possibly mineral salts and diverse substances chosen from among those usually used for obtaining these pharmaceutic forms (tweens, glues, gelatins, glycerol).

As non-limitative examples, three pharmaceutical formulations of the pectinate of bismuth are given below:

FORMULA I

| | G. |
|---|---|
| Finely ground pectinate of bismuth | 5 |

For a sachet or envelope. To be mixed in a glass of water.

FORMULA II

| | G. |
|---|---|
| Pectinate of bismuth | 25 |
| Sodium chloride | 1 |
| Syrup of citric acid or of raspberry | 20 |
| Water, q.s.ad 100 cc. | |

To be taken by teaspoon divided according to the amount of the daily dose.

FORMULA III

| | G. |
|---|---|
| Pectinate of bismuth | 1.5 |
| Bismuth subnitrate | 3.5 |

For a sachet. To be dissolved in a glass of water.

The average amount administered in a 24 hour period is 5 g. of the pectinate of bismuth as active principle, but this amount can be modified as a function of the case being treated.

The preceding examples are illustrative of the invention. It is obvious however that changes and variations occurring to those skilled in the art may be employed without departing from the spirit of the invention and the scope of the appended claims.

We claim:

1. The pectinate of bismuth containing between 10% and 30% of bismuth by weight and having a specific rotation, in dilute hydrochloric acid, of between about +140° and about +150°.

2. A process for the production of the pectinate of bismuth containing between 10% and 30% of bismuth by weight and having a specific rotation, in dilute hydrochloric acid, of between about +140° and about +150°, which comprises the steps of mixing an aqueous solution of pectin with an aqueous solution of a salt of bismuth in the presence of a substance which prevents hydrolysis of said salt of bismuth and simultaneous precipitation of an insoluble basic salt of bismuth, filtering and washing the gel formed and recovering said pectinate of bismuth.

3. A process according to claim 2 wherein said pectinate of bismuth in gel form is preliminarily dehydrated by washings with a liquid having an affinity for water and in which said pectinate of bismuth is insoluble and thereafter dried to recover said pectinate of bismuth as a powder.

4. A process for the production of the pectinate of bismuth containing between 10% and 30% of bismuth by weight and having a specific rotation, in dilute hydrochloric acid, of between +140° and about +150°, which comprises the steps of mixing an aqueous solution of pectin with an aqueous solution of a salt of bismuth in the presence of a substance which prevents hydrolysis of the salt of bismuth and simultaneous precipitation of an insoluble basic salt of bismuth, filtering, washing the pectinate of bismuth in gel form successively with water and with a liquid having an affinity for water and in which said pectinate of bismuth is insoluble, drying and recovering said pectinate of bismuth.

5. The process of claim 4 wherein said substance preventing hydrolysis of the salt of bismuth is a strong acid in such an amount as to avoid the coprecipitation of basic salts of bismuth and to avoid the dissolution of the pectinate of bismuth formed.

6. The process of claim 5 wherein said strong acid is nitric acid in amount between about one time and three times the amount of elemental bismuth utilized.

7. The process of claim 4 wherein said substance preventing hydrolysis of the salt of bismuth is an organic polyol in an amount sufficient to avoid the coprecipitation of the basic salts of bismuth.

8. The process of claim 7 wherein said organic polyol is glycerol in an amount between about 2% and 20% of the volume of the reaction mixture.

9. The process of claim 4 wherein said liquid having an affinity for water is ethanol.

10. The process of claim 4 wherein said liquid having an affinity for water is acetone.

11. An aqueous gel of the pectinate of bismuth, said pectinate of bismuth containing between 10% and 30% of bismuth by weight and having a specific rotation, in dilute hydrochloric acid, of between about +140° and about +150°.

12. A cosmetic product comprising an aqueous gel of the pectinate of bismuth, said pectinate of bismuth containing between 10% and 30% of bismuth by weight and having a specific rotation, in dilute hydrochloric acid, of between about +140° and about +150°, in a solution of a strong electrolyte.

13. A therapeutic product comprising a major amount of the pectinate of bismuth, said pectinate of bismuth containing between 10% and 30% of bismuth by weight and having a specific rotation, in dilute hydrochloric acid, of between about +140° and about +150°, and an inert non-toxic pharmaceutical carrier.

14. A method of treating gastroenteric disturbances which comprises administering orally to a patent an effective amount of the pectinate of bismuth, said pectinate of bismuth containing between 10% and 30% of bismuth by weight and having a specific rotation, in dilute hydrochloric acid, of between about +140° and about +150°.

(References on following page)

References Cited by the Examiner

UNITED STATES PATENTS

| | | | |
|---|---|---|---|
| 2,259,767 | 10/1941 | Myers | 260—209.5 XR |
| 2,373,729 | 4/1945 | Willaman | 260—209.5 |
| 2,416,176 | 2/1947 | Hoar | 260—209.5 |
| 2,448,818 | 9/1948 | McCready | 260—209.5 |
| 2,550,705 | 5/1951 | MaClay et al. | 260—209.5 |
| 2,802,773 | 8/1957 | Beekman | 167—55 |
| 3,041,245 | 6/1962 | Keck | 167—90 |

LEON J. BERCOVITZ, *Primary Examiner.*

FRANK CACCIAPAGLIA, JR., *Examiner.*

R. W. MULCAHY, S. ROSEN, *Assistant Examiners.*